Figure 1:
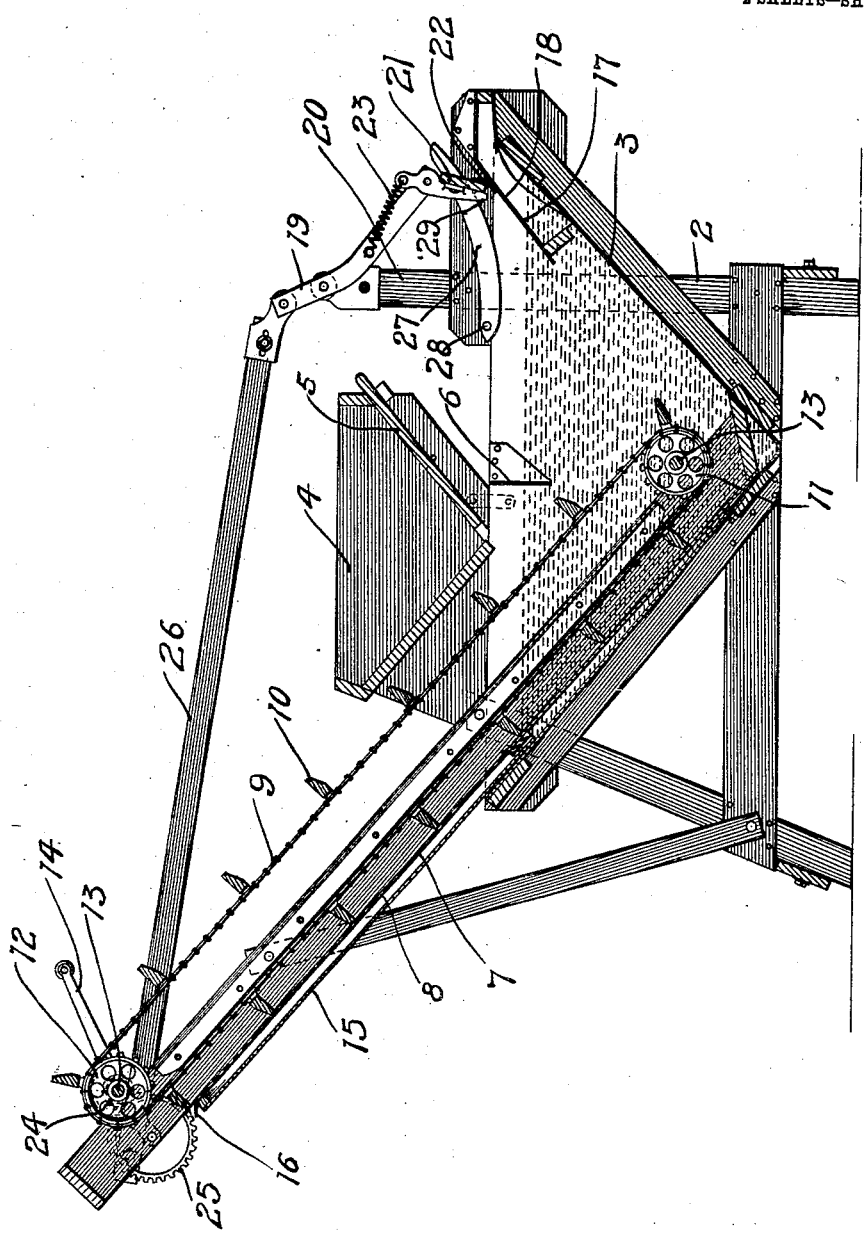

R. J. OWENS.
SMUT MACHINE.
APPLICATION FILED JUNE 18, 1906.

915,107.

Patented Mar. 16, 1909.
2 SHEETS—SHEET 1.

WITNESSES

INVENTOR
ROBERT J. OWENS.
BY
HIS ATTORNEYS

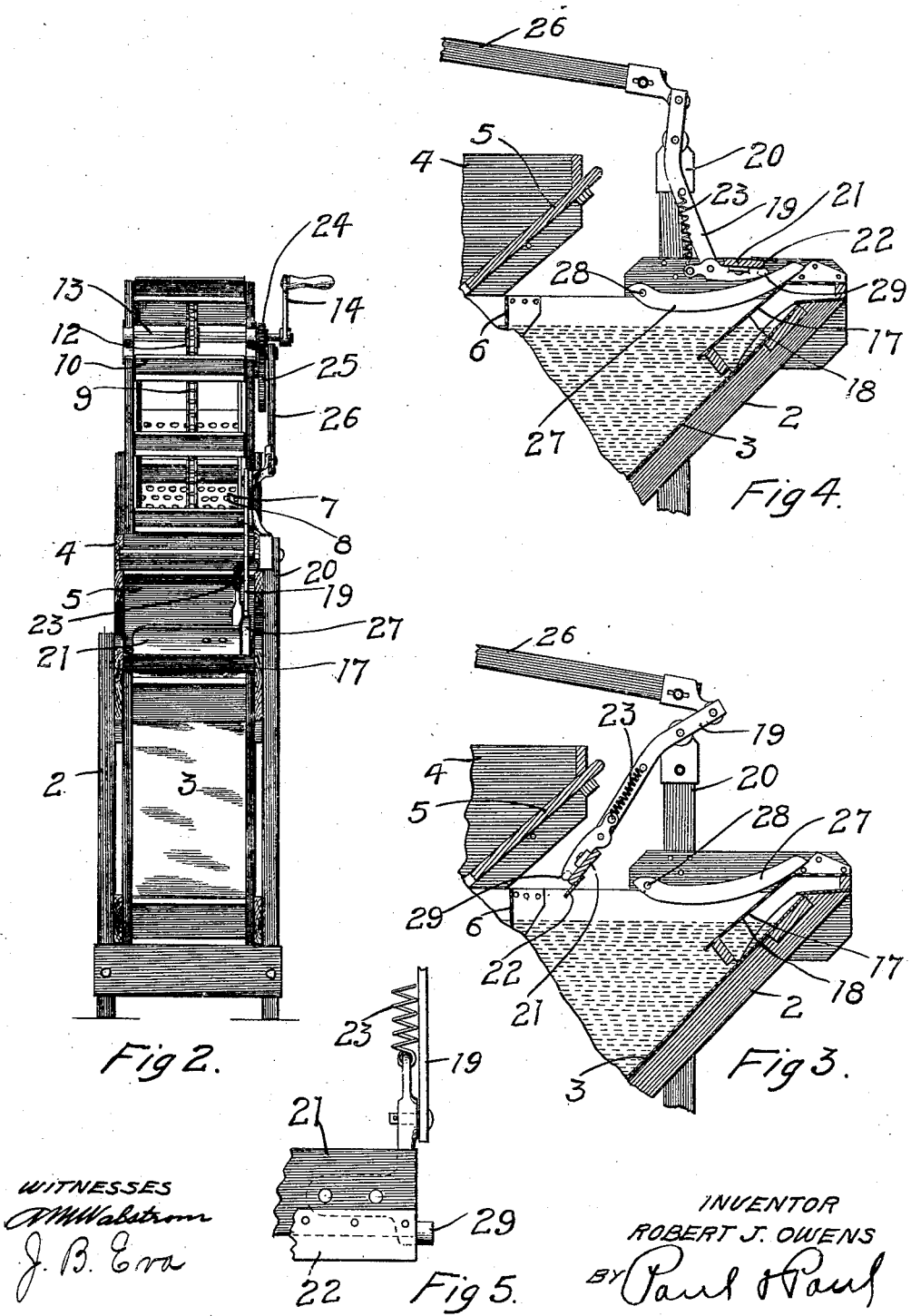

UNITED STATES PATENT OFFICE.

ROBERT J. OWENS, OF MINNEAPOLIS, MINNESOTA.

SMUT-MACHINE.

No. 915,107.  Specification of Letters Patent.  Patented March 16, 1909.

Application filed June 18, 1906. Serial No. 322,158.

*To all whom it may concern:*

Be it known that I, ROBERT J. OWENS, of Minneapolis, county of Hennepin, State of Minnesota, have invented certain new and useful Improvements in Smut-Machines, of which the following is a specification.

The object of my invention is to provide an improved machine wherein the smut balls can be easily separated from the wheat.

The invention consists generally in various constructions and combinations, all as hereinafter described and particularly pointed out in the claims.

In the accompanying drawings, forming part of this specification; Figure 1 is a vertical sectional view of a smut machine embodying my invention. Fig. 2 is an end elevation of the same. Fig. 3 is a detail sectional view illustrating the mechanism employed for skimming the smut balls off the surface of the solution. Fig. 4 is a similar view illustrating the skimming apparatus on its return stroke. Fig. 5 is a detail view looking toward the front of one end of the skimming device.

In the drawing, 2 represents a suitable frame wherein a tank 3 substantially V-shaped in cross section and having an open top and adapted to contain a supply of liquid solution, is mounted. A hopper 4 is arranged above said tank having a slide 5 by means of which the discharge of the grain from the hopper into the tank is controlled.

A plate 6 is preferably secured to the walls of the tank near the discharge opening in the hopper and extends from side to side of the tank depending into the liquid therein, to deflect the grain as it is discharged from the hopper, toward the elevating device. On one of the side walls of the tank a plate 7 is provided extending from the bottom of the tank and having a series of perforations 8. This plate forms a floor over which an elevator belt is adapted to travel. This belt consists of a sprocket chain 9 having cross slats or scrapers 10 and operating over sprocket wheels 11 and 12 mounted on shafts 13 at each end of the perforated floor. The upper shaft 13 is provided with an operating crank 14. Beneath the perforated floor 7 is an imperforate plate 15 extending within the tank and forming with the wall of the tank an imperforate floor beneath the perforated plate 7. The upper end of the plate 7 terminates in a downwardly curved lip 16 over which the treated grain is discharged by the movement of the scrapers. On the opposite wall of the tank an inclined plate 17 is arranged having perforations 18.

A lever 19 is pivoted on a standard 20 and carries a pivoted skimmer 21 at its lower end, said skimmer having a strip of flexible material 22 which sweeps over the surface of the solution and moves it upon the inclined plate 17 and from thence out of the tank. A spring 23 connects the skimmer with the lever 19 and normally holds the said skimmer in line with said lever as shown in Fig. 3. For the purpose of oscillating the lever 19 I provide a pinion 24 on the crank shaft 13 meshing with a gear 25 which has a pitman rod connection 26 with the upper end of the lever 19. To prevent the skimmer from sweeping the smut balls and scum away from the perforated plate 17 on its return stroke, I provide a cam device 27 pivoted at 28 on the wall of the tank in position to engage a stud 29 on one end of the skimmer. This stud will pass under the cam 27 when the skimmer is sweeping the smut balls toward the perforated plate and on the return stroke of the skimmer, the stud will ride on the upper edge of the cam as indicated in Fig. 4, and be held up out of the solution until the skimmer has reached the end of its return stroke. At that point the stud will pass off from the cam and allow the skimmer to swing down to its normal position.

In the operation of the machine a suitable amount of solution is placed in the tank, and grain poured into the hopper and allowed to fall through the discharge opening into the water beneath. The plate 6 will deflect the grain toward the elevator and as it settles to the bottom of the tank it will be gathered up by the scrapers and lifted out of the machine. The smut balls will float on the surface of the water and be separated from the grain, and as the elevator belt lifts the grain out of the machine the lever 19 will be oscillated to sweep the accumulation of smut balls and scum on the surface of the water toward and upon the perforated plate 17. The water gathered up by the skimmer will flow back through the perforations into the tank while the smut balls will be swept on and discharged out of the tank. On the return stroke of the skimmer the stud will engage the cam device and the skimmer will be held up out of the water and cannot come in contact therewith until the lever reaches the end of its return stroke. In this way the skimmer will be prevented from sweeping the smut balls away from the plate 17 in the return stroke of the skimmer.

I claim as my invention:

1. The combination, with a smut machine tank adapted to contain a supply of water, an inclined plate provided on the wall of said tank and having a series of perforations, a lever pivoted at a point intermediate to its ends above said tank, a skimmer mounted on the lower end of said lever and having a strip of flexible material on one edge adapted to sweep over the surface of the solution in the tank and up over the surface of said inclined plate, a spring yieldingly connecting said skimmer with said lever, said skimmer having a stud on one end and a cam device mounted on the wall of said tank at one side of said inclined plate adapted to engage said stud and raise said skimmer against the tension of its spring above the level of the solution in the tank on the backward or return stroke of said lever, substantially as described.

2. The combination, with a tank adapted to contain a supply of water and having an inclined wall, of an inclined plate mounted on said wall and having a series of perforations and a horizontal upper portion, the lower portion of said inclined plate being normally below the level of the solution in the tank, an oscillating lever, a skimmer pivoted thereon and having a flexible edge adapted to sweep over the surface of the solution, a spring connecting said lever with said skimmer device, and means for tilting said skimmer device and raising its flexible edge out of contact with said perforated plate and above the level of the solution on the return stroke of said lever.

In witness whereof, I have hereunto set my hand this 14th day of June 1906.

ROBERT J. OWENS.

Witnesses:
RICHARD PAUL,
J. B. ERA.